Aug. 30, 1960 G. LEWIN 2,950,971

MULTIPLE SOUND TRACKS

Filed Dec. 17, 1957

INVENTOR.
GEORGE LEWIN
BY
Harry M. Saragovitz
ATTORNEY 2,950,971

MULTIPLE SOUND TRACKS

George Lewin, 1573 E. 35th St., Brooklyn 34, N.Y.

Filed Dec. 17, 1957, Ser. No. 703,467
7 Claims. (Cl. 96—79)
(Granted under Title 35, U.S. Code (1952), sec. 266)

The invention described herein may be manufactured and used by and for the United States Government for governmental purposes without the payment of any royalty thereon.

The invention relates to multiple sound recording tracks on motion picture film and sound recording tracks upon tape.

There is a need for multiple sound tracks on motion picture film and on sound recording tape. The supplying of this need, however, is complicated by the limitations of space and the minimum space requirements for adequate sound tracks.

The need arises out of the desire for stereophonic reproductions, binaural effects, bilingual recordings, running commentaries and the desire to provide recordings suited to different reproduction equipment.

In the prior art arrangement of optical and magnetic recording sound tracks, the magnetic tracks were a source of noise in the reproductions of the optical recording. The close relation of the magnetic recording tracks, with their rough or uneven edges or their inaccurate and wavy placement was the cause not only of background noise but also distortions in the reproduction of the optical recordings. This close relation was brought about by the need to conserve space and to produce two or more sound tracks in the space where previously only one sound track was present. In an effort to meet the demands, the prior allotted space for sound recordings was divided and half of the space was allotted to each type of sound recording track. This arrangement was found to be objectionable because, on the one hand, a narrower magnetic stripe caused uneven wear on the pickup head and on the other hand the amplitude of the recordings were of low level.

In some instances the prior art structures had the sound tracks arranged in an adjacent parallel arrangement, each track occupying half the space allotted to sound recordings. In another structure, the optical sound track is of normal width occupying the entire allotted space and the magnetic oxide stripe of reduced width occupies the central portion of the optical sound track.

In each instance not only must the transverse width of the magnetic stripe be either uniformly transparent or completely opaque. Its edges must be uniform and have perfectly smooth edges, but also it must be accurately placed parallel to the center line of the optical track and must remain so. The conditions are subject to sudden and relatively large fluctuations from the optimum due to unpredictable variations in recording, printing and film slitting machines and to splices in the film. Failure to conform to this requirement results in clipping of peaks and may completely obliterate the low level portions of the optical recording. It has been found in practice that uniformity of opaqueness or transparency is much easier to obtain and maintain than uniformity of transverse dimensions and evenness of the edges.

The present invention relates to an improvement in the combination of optical and magnetic sound tracks arranged to occupy the same space, whereby the full width of the allotted space may be occupied by each of the sound tracks and whereby the presence of the magnetic sound track will not cause the introduction of noise and distortion during the reproduction of the optical sound track recording.

A major benefit of this invention is that the application of the magnetic stripe becomes much less critical because it is not necessary to follow the centerline of the optical recording and the width need not be precise as long as it remains wider than the active part of the optical track.

Another major benefit is that the output level from the magnetic track is at least six decibels higher than that obtained from the half-width track necessary in the prior art arrangements for the same input level, resulting in improved signal to noise ratio and lower distortions.

A further important benefit of the invention is that it permits the optical sound track to be recorded in the usual manner while simultaneously a magnetic sound track may be recorded upon the same film, both sound tracks being reproducible simultaneously, or separately, after development of the film, thus providing a variety of advantages.

An additional and beneficial result is realized when the magnetic stripe is laid upon the photographic emulsion of the sound track, in that the emulsion is completely concealed and protected against scratches and wear, thus preserving the optical sound track for use over a greater period.

An object of the invention is to provide a multiple sound track in the same space previously allotted to one track without the reduction of width required in previous multiple sound tracks.

Another object of the invention is to provide an arrangement of optical and magnetic sound tracks in the space previously allotted to the optical sound track without the attending noise and distortion previously experienced with the combination.

Another object of the invention is to provide an arrangement of optical and magnetic sound tracks in the space previously allotted to the optical sound track whereon the magnetic sound track completely covers the optical sound track and protects it against wear.

Other objects of the invention will appear obvious from the disclosure of the specification and claims taken with the disclosure of the accompanying drawings in which:

Figures 1, 2, 3, 4, 5, 6, 7, 8:
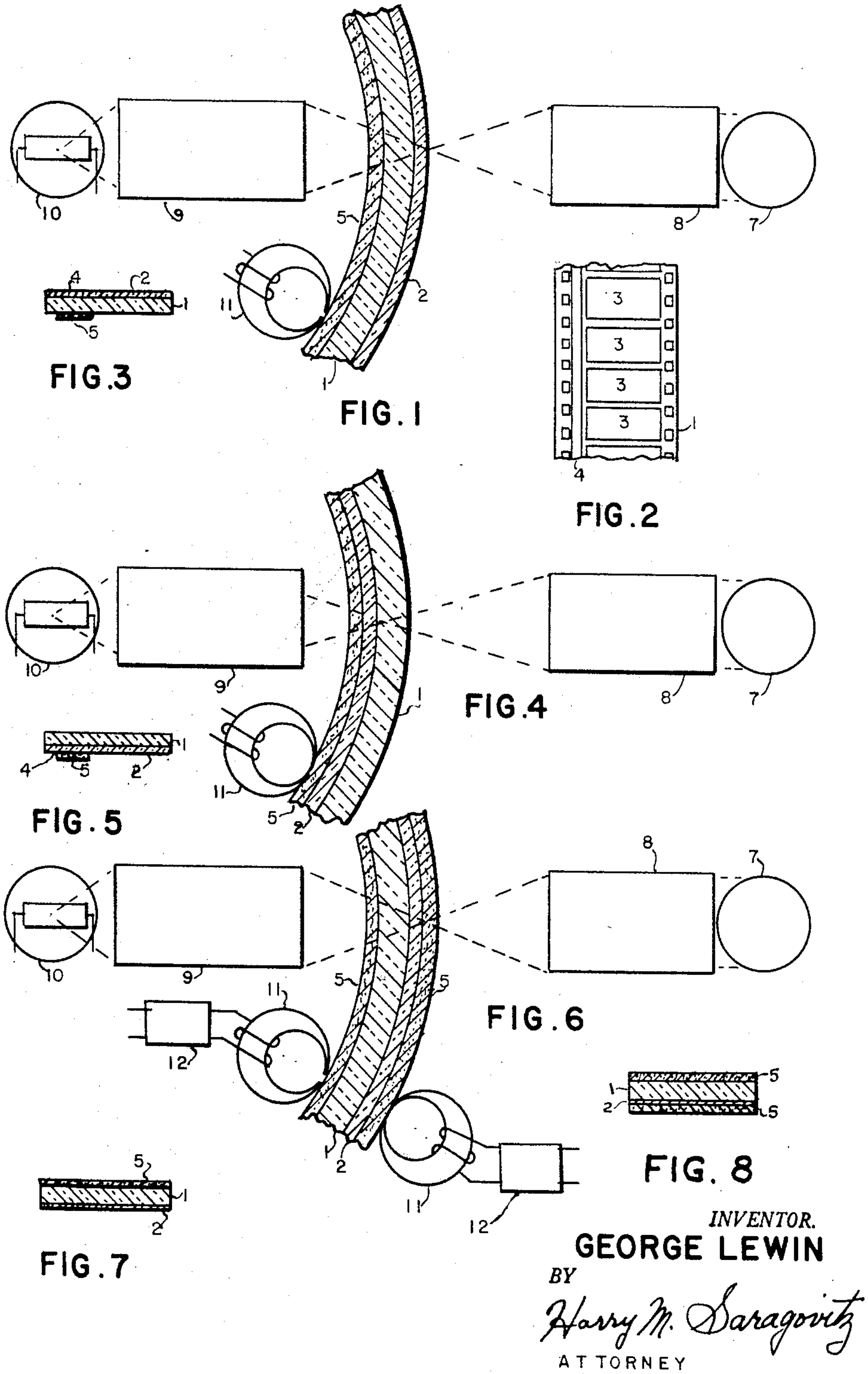
Fig. 1 is a diagrammatic view of a combined optical and magnetic recording reproduction equipment incorporating a film wherein the invention is embodied.
Fig. 2 is a plan view of the film of the invention.
Fig. 3 is a sectional view of the film showing the arrangement of the magnetic recording stripe thereon.
Fig. 4 is a diagrammatic view of a combined optical and magnetic recording reproduction equipment incorporating a film wherein a different embodiment of the invention is shown.
Fig. 5 is a sectional view of the film used in Fig. 4.
Fig. 6 is a diagrammatic view of a sound reproduction apparatus wherein a film is incorporated embodying another form of the invention.
Fig. 7 is a sectional view of a tape designed for both optical and magnetic recording sound tracks.
Fig. 8 is a sectional view of a tape designed for two magnetic tracks completely concealing an optical track.

One embodiment of the invention is illustrated in Figs. 1 to 3 inclusive. In Fig. 1 there is an arrangement for sound reproduction of an optical and a magnetic recording. The arrangement may be associated with a motion picture projector or it may be associated with a sound reproducer. In the arrangement of Fig. 1 a motion picture film having a base 1 is provided with a photographic emulsion 2 on one side thereof which provides a picture portion 3 and an optical sound track portion 4, which appears more clearly in Fig. 2.

In the production of motion picture film, the film is exposed and at the same time the sound track may be exposed to a light beam which is modulated by electrical current in accordance with the sound produced simultaneously with the picture scene. The film is then developed to produce the picture and also a variable transparency along the sound track portion 4 in accordance with the variation of the light previously focused on the elemental areas thereof. The variable transparency may be of the variable density form or of the form in which the transverse dimension of the transparent portion is variable.

The film may also be produced by printing the picture 3 and the optical sound track portion 4 from a negative while the magnetic sound can be simultaneously or subsequently recorded. The printing can be by contact or optically in one to one ratio, by reduction or enlargement.

In this particular embodiment of the invention, a magnetic oxide stripe 5 is deposited on the opposite side of the film base 1 from that upon which the photographic emulsion 2 is deposited to form a magnetic sound track located to coincide with the photographic sound track portion 4. The oxide stripe may be deposited by a striping machine in the form of a deposit of magnetic oxide 5 contained in a binder material or it may be incorporated in the form of a lamination cemented to the base of the motion picture film. The lamination, which is previously prepared, contains the magnetic oxide material embedded therein.

The magnetic oxide stripe must be deposited with uniform thickness and the oxide particles must be uniformly distributed over the allotted area to provide for uniform transparency, otherwise, the non-uniformity of transparency would modulate the light beam the same as the optical sound track. This would cause the introduction of noises and distortions during the reproduction of the optical recording.

Fig. 1 further shows the various components of the sound reproducers whereby the sound recordings in the optical and magnetic sound tracks may be reproduced. For reproducing the recording on the optical sound track a light beam is focused through the sound track upon the sensitive surface of a photocell whereby the light beam will be modulated by the optical record as it is moved across the light beam and produces a voltage from the photocell that is like modulated. The magnetic oxide strip 5 is interposed in the path of light, as is evident in Fig. 3, on the side of the film base 1 opposite the optical sound track 4. When it has a uniform transparency it does not interfere with the modulation of the light beam by the optical sound track portion 4. The optical reproducer includes a source of light 7 having the desired spectral components which pass through the magnetic oxide stripe 5, as for example, those spectral components found in the infra-red region of the light spectrum. The light from the source 7 is focused by a lens 8 upon the motion picture film through the optical sound track portion 4. On the other side of the motion picture film is another lens system 9 which gathers the light passing through the sound track portion 4 and modulated thereby and focuses the light upon the sensitive surface of a photocell 10.

In the present example the light source 7 contains materials which produce components in the infra-red portion of the light spectrum. A photocell or photosensitive element 10 is made of materials having its maximum response in the infra-red light portion of the spectrum. When the magnetic stripe 5 possesses the desired uniform transparency to infra-red light, its presence upon the optical sound track portion 4 will not create noise or distortions in the reproduction of the recordings on the optical sound track portion 4.

While this light source is designed to develop infra-red light, since it has been found that magnetic oxide film coating has a transparency to infra-red light and a photocell is selected that has an infra-red response, it is possible that light in other parts of the light spectrum may be used by the proper selection of binder materials and magnetic materials which are transparent to the selected light.

In the arrangement of Fig. 1 the magnetic oxide coating is on the opposite side of the motion picture film from the photographic emulsion and requires that the magnetic pickup head be positioned where the stripe 5 will be able to pass in contact therewith. The magnetic pickup head 11 of a conventional type is displaced slightly from the optical pickup means for convenience of mounting.

In this arrangement reproduction of the sound recordings on either or both of the tracks may be had separately or simultaneously. The film may be used in a motion picture projector equipped with either an optical sound reproducer or a magnetic sound reproducer head. It may be used also with a projector having both optical and magnetic sound reproducers and when the film is recorded in both tracks with the same sound from different microphones, it may be used to produce stereophonic effects.

Figs. 4 and 5 illustrate a second embodiment of the invention which differs from the first embodiment of the invention merely in the placement of the oxide stripe 5 relative to the emulsion 2. Similar elements shown in these figures are indicated by the same reference characters. The motion picture film has a base 1 on which is an emulsion 2 whereby the picture portion 3 and the optical sound track portion 4 are provided for. In this invention embodiment the magnetic oxide stripe 5 or lamination is deposited over the emulsion 2 of the optical sound track portion 4 so that it completely covers the same. The reproduction apparatus includes the same infra-red light source 7, providing a light that is focused by the lens system 8 upon the motion picture film in the plane of the photographic emulsion 2. The lens system 9 collects the infra-red light passing through the optical sound track portion 4 and the magnetic oxide stripe 5 and directs the light modulated by the optical sound track portion 4 upon the surface of the infra-red light sensitive cell 10. In the present example the light cell 10 is a lead sulphide cell, known to have a response to the infra-red light. The magnetic pickup head 11 is located in the same position that it occupies in the first embodiment of the invention.

The present embodiment of the invention possesses an additional beneficial feature in that the magnetic oxide stripe 5 covers the emulsion in the region of the optical sound track portion 4 and thereby protects the emulsion against wear and scratches, thus preserving the optical record for a longer period of time than heretofore possible with prior art arrangements. In the present embodiment the focusing of the light in the plane of the emulsion additionally requires that consideration be given to the refracting characteristics of the base material of the film.

Fig. 5 shows the arrangement of the magnetic oxide stripe 5 relative to the photographic emulsion 2 positioned to cover the emulsion 2 in the region of the optical sound track portion 4. The width of the magnetic oxide coating is equal to or greater than the width of the optical track portion 4 so that all the light passing through the optical sound track portion 4 also must pass through the magnetic oxide stripe 5.

Fig. 6 illustrates still another embodiment of the invention wherein three sound tracks of normal width may be disposed in the same space where previously only one sound track of normal width was disposed. In this embodiment, the film base 1 has the usual photographic emulsion 2 on one side thereof, which may provide the picture portions 3 and the sound track portion 4 or may provide solely a sound track portion. A deposit of magnetic oxide to form a magnetic oxide stripe 5 is laid upon the base film upon both sides of the base 1, one deposit forming a stripe covering the photographic emulsion in the region of the sound track portion 4 and the other deposit forming a stripe in the same region but on the opposite side of the film base 1. This arrangement provides for three separate recordings in the same space.

As illustrated, a pair of pick up heads 11 are arranged on opposite sides of the film base whereby the magnetic stripe 5 may pass in contact therewith. Because the magnetic oxide stripes 5 are separated by the thickness of the base portion 1 and the photographic emulsion 2, the high frequency interference is effectively prevented. However, there is a low frequency interference of low amplitude present in the outputs of the separate pickup heads 11 when the stripes are thusly arranged. This low frequency interference may be effectively eliminated by the provision of filter circuits in the outputs of the pick-up heads 11, shown at 12. It is to be understood that the arrangement of Fig. 6 also includes the optical pick-up means shown in the illustration of the other embodiments.

Fig. 7 illustrates an arrangement of photographic emulsion 2 forming an optical sound track 4, which may constitute part or all of said emulsion, on one side of a film base 1 and a deposit of magnetic oxide forming a magnetic oxide stripe 5 on the other side of the film base 1. The tape thus formed is capable of being used in either or both an optical sound reproducer and magnetic sound reproducer. This arrangement provides for the stereophonic, binaural or independent effects that may be desired.

Fig. 8 illustrates an arrangement similar to Fig. 7 with the addition of a second magnetic stripe completely covering the photographic emulsion, thus providing for three sound tracks and at the same time completely concealing the optical sound track as well as protecting it against scratches.

The structures operate in the following manner. A light which is capable of penetrating the magnetic oxide stripe 5 is focused upon the photographic emulsion 2 in the region of the sound track 4. The sound track 4 possesses a variable transparency along the length thereof which modulates the light when the film moves thereacross. The modulated light is picked up by the lens system and focused upon the light sensitive cell which responds to produce an electrical current similarly modulated. Simultaneously or separately the magnetic heads engage the magnetic oxide stripes and as the film moves across the heads an electrical current is generated in the heads in proportion to the magnetization imposed in the oxide. The electrical currents may be amplified and caused to operate speakers for the reproduction of sound that is recorded on the several tracks. It is obvious that the motion picture film or sound recording tape thus constructed permits its use in a projector equipped with either optical or magnetic reproduction apparatus. It also is usable in a projector equipped with both optical and magnetic reproducing apparatus for the producing of stereophonic, binaural and bilingual functions.

In the present structure certain advantages and benefits are derived which cannot be obtained from prior art structures. Multiple sound tracks may be provided in the same space where one previously existed. The sound tracks may be made to occupy the full amount of allotted space thus providing for a full range of tonal qualities and for a high ratio of signal to noise level. In the embodiment of Fig. 4 the photographic sound track is protected against scratches and wear by the magnetic oxide stripe. In Fig. 6 the optical sound track is concealed by the magnetic oxide stripes and this structure lends itself to secrecy requirements that may at times be desirable. In addition, the distortions and noise prevalent in prior art arrangements of magnetic and optical recordings when arranged in the same or adjacent tracks is materially reduced.

Having described my invention and the best mode of practicing the same, what I desire to secure by Letters Patent is set forth in the following claims.

I claim:

1. A multiple sound track means comprising a base film uniformly transparent to light of the infra-red portion of the light spectrum, an emulsion having an optical sound image therein deposited upon one surface of said base film providing an optical sound track to modulate the light of said infra-red portion of the light spectrum and means comprising magnetic iron oxide in a binder that is uniformly transparent to the light of said infra-red portion of the light spectrum deposited upon said base film in superposed relation to said emulsion for providing a magnetic sound track, said magnetic iron oxide sound track having a slightly greater transverse width than said optical sound track so as to extend beyond the edges of said optical sound track.

2. A motion picture film comprising a film base uniformly transparent to infra-red light, an emulsion deposited on one surface of said film base for forming a picture portion and an optical sound track portion, said optical sound track portion of said emulsion having an optical sound image therein capable of modulating infra-red light, said optical sound track portion being located between the picture portion and one edge of said film base, and means comprising a magnetic iron oxide in a binder uniformly transparent to infra-red light deposited on said film base in superposed relation to the optical sound track to form a magnetic sound track having a slightly greater transverse dimension than the optical sound track so as to extend beyond the edges of said optical sound track.

3. A multiple sound track means comprising a film base uniformly transparent to infra-red light, an emulsion having an optical sound image therein deposited on one surface of said film base forming a variable transparency to infra-red light along said film base in accordance with a sound record and means comprising magnetic iron oxide in a binder uniformly transparent to infra-red light deposited on the opposite surface of said film base for forming a magnetic sound track, said magnetic sound track having slightly greater transverse dimension than said emulsion and superposed with relation to said emulsion.

4. A multiple sound track means comprising a film base uniformly transparent to infra-red light, an emulsion having an optical sound image therein deposited on one surface of said film base forming a sound track of variable transparency to infra-red light along said film base in accordance with a sound record, and means comprising magnetic iron oxide in a binder uniformly transparent to infra-red light deposited on said film base over said emulsion in superposed relation thereto to completely cover said emulsion for forming a magnetic sound track.

5. A multiple sound track means comprising a film base uniformly transparent to infra-red light, an emulsion having an optical sound image therein deposited on one surface of said film base for forming a sound track of variable transparency to infra-red light along said film base in accordance with a sound record, and means comprising magnetic iron oxide in a binder uniformly transparent to infra-red light deposited on said film base over said emulsion and on the opposite surface of said film base to form a plurality of magnetic sound tracks superposed with relation to said sound track of variable transparency, said magnetic iron oxide having a greater width than said emulsion and said magnetic sound tracks completely covering said optical sound track.

6. A motion picture film comprising a film base of uniform transparency to infra-red light, an emulsion deposited on one surface of said film base for forming a picture portion and an optical sound track portion between the picture portion and one edge of said film base, said emulsion in said optical sound track portion having an optical sound image therein to form a variable transparency to infra-red light, and means comprising magnetic iron oxide in a binder uniformly transparent to infra-red light deposited on said film base on the surface opposite to that on which said emulsion is deposited and in superposed relation to said optical sound track portion, said magnetic iron oxide having a greater width than the emulsion of said optical sound track portion for forming a magnetic sound track coincident with said optical sound track portion.

7. A motion picture film comprising a film base uniformly transparent to infra-red light, an emulsion deposited on one surface of said film base forming a picture portion and an optical sound track portion, said emulsion in said optical sound track portion having an optical sound image therein variably transparent to infra-red light, and means comprising magnetic iron oxide in a binder uniformly transparent to infra-red light deposited on said film base over said emulsion superposed over said optical sound track portion and on the opposite surface of said film base in superposed relation to said optical sound track portion, said magnetic iron oxide having a greater width than the emulsion of said optical sound track portion for forming a plurality of magnetic sound tracks coincident with said optical sound track portion.

References Cited in the file of this patent

UNITED STATES PATENTS

| | | |
|---|---|---|
| 1,260,337 | Craig | Mar. 26, 1918 |
| 2,480,162 | Rath | Aug. 30, 1949 |
| 2,550,803 | Goddard | May 1, 1951 |
| 2,628,288 | Blaney | Feb. 10, 1953 |